United States Patent [19]

Roberts et al.

[11] 3,891,941
[45] June 24, 1975

[54] IMPLODING CYLINDER METAL VAPOR LASER

[75] Inventors: Thomas G. Roberts; Thomas A. Barr, Jr.; Charles M. Rust, all of Huntsville, Ala.

[73] Assignee: The United States of America as represented by the Secretary of the Army, Washington, D.C.

[22] Filed: Jan. 25, 1974

[21] Appl. No.: 436,580

[52] U.S. Cl. ....... 331/94.5 G; 330/4.3; 331/94.5 PE; 331/94.5 P; 313/227; 313/228
[51] Int. Cl. .......................... H01s 3/22; H01s 3/09
[58] Field of Search .................... 330/4.3; 331/94.5; 313/223 T

[56] References Cited
UNITED STATES PATENTS
3,619,812  11/1971  Asmus ............................. 331/94.5

OTHER PUBLICATIONS
Baksht et al., Soviet Journal of Quantum Electronics, Vol. 2, No. 3, Nov.–Dec., 1972, pp. 272–3. Art Unit 257 TK 8300 S6.

Karabut et al., Soviet Physics–Technical Physics, Vol. 14, No. 10, April, 1970, pp. 1447–1448. Avail. Art Unit 258.

*Primary Examiner*—Robert J. Webster
*Attorney, Agent, or Firm*—Robert P. Gibson; Nathan Edelberg

[57] ABSTRACT

The imploding cylinder metal vapor laser is a laser that utilizes an electric discharge to create metal vapor at densities which are disposed for both pumping to laser action by the original pulse of electricity or by one or more succeeding electric pulses, and for optical cavity geometry. A glass laser tube has the inner surface thereof coated with a vaporizable metal. A high current pulse is discharged through the inner metal surface, vaporizing the metal throughout the chamber and providing dense vapor for succeeding current pulses to discharge through, providing lasing. The laser may be superradiant under high gain conditions, requiring no optical cavity for operation, or may be operated at lower gains with an optical cavity.

7 Claims, 1 Drawing Figure

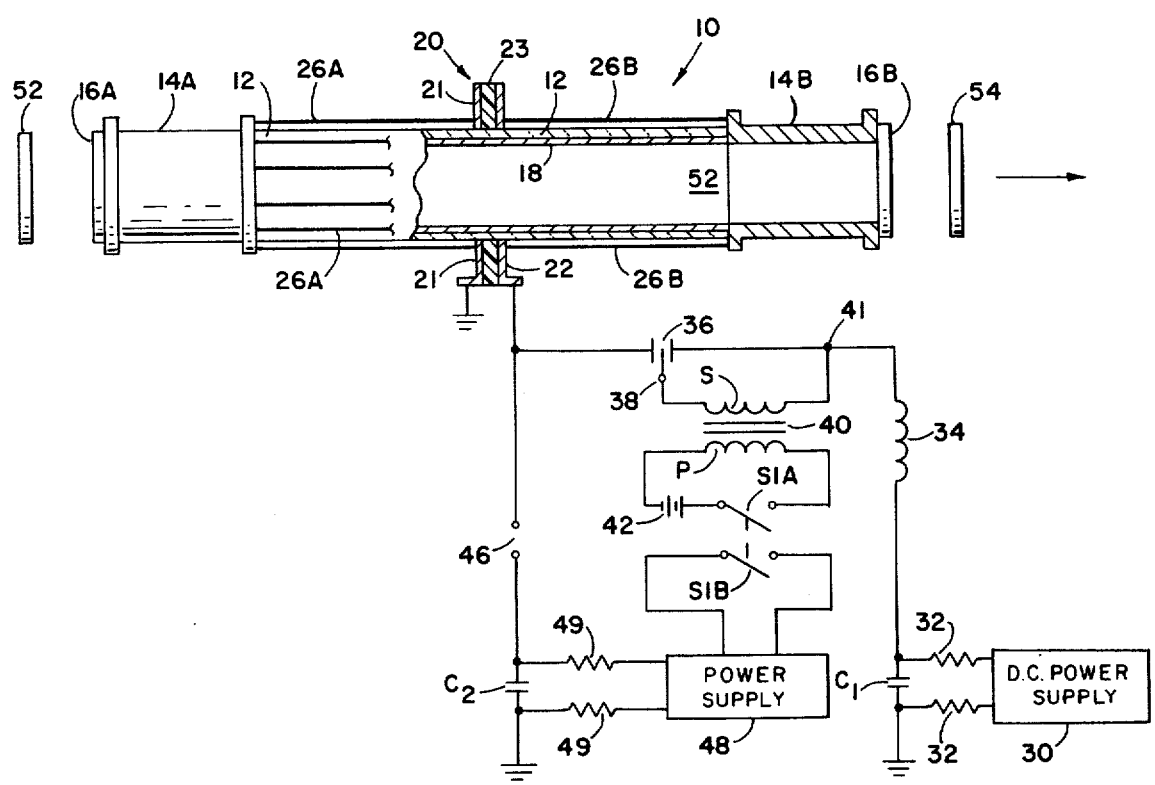

INPLODING CYLINDER METAL VAPOR LASER

BACKGROUND OF THE INVENTION

The efficiencies of currently available gas lasers in the visible region of the frequency spectrum are relatively low. Low efficiency is also unavoidable in rare gas and ion lasers because of the large energy spacing between the ground level and all potential laser levels. However, the low lying energy levels of certain metals and transition elements make them potentially efficient high power lasers in the visible region of the spectrum. The selection of the most appropriate laser levels can be made on the basis of electron-atom inelastic collision cross-sections, the branching ratio of the upper level, the value of the transition probability connecting the two levels, and the level populations at the working temperature. Those energy levels in the neutral atom that are both close to and optically connected with the ground level can be efficiently and selectively excited or pumped by electron collisions. Thus, the basic requirement for a pulsed metal vapor laser is the presence of a metastable energy level between the ground level and the resonance level, so that, during a fast current pulse with a short rise time, excitation is provided by electron-atom collisions, while inelastic collisions relax the lower laser level. However, in these pulsed lasers collisional excitation and relaxation occur sequentially rather than simultaneously and only a transient population inversion is produced. The transient population inversion persists only until the lower metastable laser level and the upper resonance laser level populations are nearly equalized by the lasing transitions. The excited atoms are then relaxed back to the ground level by collisions before the next pulse of pumping energy is applied. The interpulse period, necessary to relax the lower laser level and to deionize the plasma, determines the maximum laser pulse repetition rate and therefore the average power. However, since these excitation and relaxation processes occur sequentially, each process may be considered separately and optimized virtually independently of the other.

Currently the copper vapor laser is the most efficient of the pulsed metal vapor lasers. The limiting efficiency for this laser is about 40 percent and it should be capable of producing megawatt peak powers and average powers of hundreds of watts. However, only about 1.2 percent efficiency, 40 kilowatts peak power, and 0.5 watts average power have been obtained at a wavelength of 5106 A. Other vapors which have been made to lase are lead, manganese, gold, and calcium. In calcium the lasing occurs in the ion, $Ca^+$.

Poor efficiency has resulted in the prior art metal vapor lasers primarily because of difficulties encountered in producing the metal vapors. Atoms with appropriate energy level structures have partially filled electron shells and tend to bond strongly either to themselves or to other atoms, reducing efficiency. Therefore, very high temperatures have been required to achieve a monoatomic gas at a pressure of even a few tenths of a torr in these elements. The use of ovens or heaters to produce these temperatures cause these lasers to be extremely complicated and difficult to work with. The vapor pressures which can be produced are much too low for obtaining maximum output powers and the resulting configurations are far from ideal for producing the fast current pulses necessary for obtaining large efficiencies. Additional problems introduced by ovens or heaters include the need to keep the hot vapors away from the windows and the inability to seal off these systems from the laser itself.

Additional background information is disclosed in an article entitled "Metal Vapor Lasers" by W. T. Walter, IEEE Journal Quantum Electronics Conference, May 1968, pages 355-356.

SUMMARY OF THE INVENTION

The imploding metal vapor laser includes a coaxial discharge tube with the inside walls plated with a vaporizable metal so that electrodes at the ends of the discharge tube are electrically shorted by the plating. Condenser banks and power supplies are switched so that one condenser bank is discharged through an inductor to produce a long current pulse which vaporizes the metal plating, and another condenser bank is subsequently discharged through a very low inductance circuit to produce short current pulses which produce the laser action in the metal vapors. The discharge tube is equipped at each end with windows for transmitting the lasing radiation and mirrors may be used outside these windows to form an optical cavity when this is desired. These mirrors can also be mounted on the discharge tube to form an internal cavity.

The apparatus of the instant invention avoids the need for using ovens or heaters by utilizing an imploding cylinder to produce metal vapors at high densities in a coaxial configuration that has low inductance, allowing fast current pulses for pumping to be readily produced. After the pumping pulses are stopped, the current pulse which produces the vapor is stopped and the vapor then condenses on the walls, which may be cooled to increase run times. After the vapor condenses it is again ready for the operating sequence to be repeated. There is nothing within the laser used up, consequently there is no need to replace anything before operating the laser again.

The cylinder which is to be imploded is a thin metal plating on the inside surface of a conventional linear pinch machine which is normally used to produce high temperature plasmas. A typical pinch machine is disclosed in an article entitled "The Pinch Effect in Pulsed Streams at Relativistic Energies" by T. G. Roberts and W. A. Bennett in Plasma Physics, Vol. 10, pp 381-389, (1969). The thin metal plating within the machine electrically shorts the electrodes of the pinch machine and the tube is operated with a fairly hard vacuum so that when the switch is closed the current is carried by this plating and remains near the wall until the plating has been evaporated. The vapor then very quickly fills the tube and the current diffuses radially until it fills the tube. The initial current pulse is then followed by a series of short current pulses which pump the laser. In this manner densities two orders of magnitude higher than those previously obtained can be obtained and the device is essentially at room temperature during the operation. The weakly ionized metal vapor plasma is obviously hot, however, it is not preheated but is produced only in the place where it is needed and only during the time it is needed. Only microseconds are required to prepare the laser for the pumping pulses whereas the prior art heated systems have to be brought up to temperatures over long periods of time to keep the temperature gradients from causing the device to thermal shock and break. Thus, zero turn on time is obtained instead of the approximately 14 hours previously required to produce the metal vapors. In view of the operation capability at prevailing ambient temperatures, this configuration may be easily scaled in both diameter and length, which is extremely difficult to do when heaters are used.

BRIEF DESCRIPTION OF THE DRAWING

The single FIGURE of the drawing discloses a preferred, diagrammatic embodiment of the inventive laser with extraneous structure omitted.

DESCRIPTION OF THE PREFERRED EMBODIMENT

Referring now to the drawings wherein a preferred embodiment of the metal vapor laser is shown, the single FIGURE discloses a laser 10 wherein a laser tube 12 has been evacuated and sealed off. Laser tube 12 is glass and has cylindrical electrodes 14A and 14B at respective ends thereof. Mounted on respective external ends of electrodes 14 are windows 16A and 16B for passing optical energy therethrough. The inner surface of tube 12 is plated with a copper plating 18, with the tubular plating terminated at each end against electrodes 14 for providing a cylindrical conductive path between the electrodes. Metal plating 18 may also be lead, manganese, gold or calcium. A parallel plate transmission line 20, which has been constructed to have minimum inductance, is disposed around the circumference of tube 12. The low inductance line 20 includes conductive plates 21 and 22 and an insulator 23 therebetween. Groups of conductive wires 26A and 26B, disposed symmetrically around the periphery of tube 12, function as conductors for electrical energy coupled to the laser, conductors 26A being coupled between plate 21 and electrode 14A and conductors 26B being coupled between plate 22 and electrode 14B. Thus a conductive path through the laser is provided from conductive plate 22 through conductor 26B, electrode 14B, metal plating 18, electrode 14A and conductor 26A to plate 21. When plating 18 is vaporized the vapor fills the chamber 52 of tube 12 and the conductive path is through the metal vapors.

The energy necessary for evaporating the metal and producing the vapor is stored in a condenser bank $C_1$. This large condenser bank is charged by a direct current power supply 30 through charging resistors 32. One side of $C_1$ is connected in series with an inductor 34 and a triggered spark gap 36 to conductor plate 22. The other side of $C_1$ is connected to ground as is conductor plate 21, providing a complete circuit across the bank. The triggering electrode 38 of the spark gap is coupled through the secondary S of a transformer 40 to a common point 41 between inductor 34 and gap 36. The primary P of transformer 40 is connected across a series connected battery 42 and switch S1A. A second spark gap 46 is connected between conductor plate 22 and one side of a capacitor $C_2$, the other side of $C_2$ being connected in common with the grounded plate 21. A power supply 48 is connected across $C_2$ through resistors 49 for providing charging potential thereto and is activated by switch S1B when S1A is activated. Power supply 48 may be simply a high voltage pulse transformer similar to those used with neon signs. The value of charging resistors 49 are adjustable so the RC charging time for $C_2$ allows spark gap 46 to break down at a preselected, desired frequency.

In operation, the energy bank $C_1$ is charged by power source 30. The potential developed across $C_1$ is also developed across gap 36. Switch S1A is closed to trigger the arc across spark gap 36, establishing the arc. Switch S1B simultaneously activates power supply 48 for charging $C_2$. Bank $C_1$ is discharged through inductor 34, the triggered spark gap 36, and plating 18 on the inside wall of the discharge tube. This discharge current evaporates the metal plating 18 causing the tube chamber 52 to be quickly filled with metal vapor so that it is ready for pumping pulses. Inductor 34 is used to increase the time for discharging $C_1$ and its value is adjustable to obtain the desired discharging time. Pumping pulses are produced by discharging capacitor $C_2$ repeatedly through spark gap 46. Spark gap 46 alternately breaks down and open circuits. The fast current pulses produced by this low inductance circuit pumps the vapor in tube 12 in a manner well established in the art, producing a population inversion whose magnitude is generally large enough to produce gains that causes the laser to be superradiant and no mirrors are needed. Since not all metals used will produce the high gains of copper vapor, a totally reflecting mirror 52 and a partially reflecting output mirror 54 are shown at respective ends of the laser, typically to form an optical cavity which would be used for vapor metal lasers that are not superradiant. After lasing ceases the copper vapor will recoat the walls of tube 12 as a metal coating. To repeat the operation, S1 is opened, capacitor bank $C_1$ is recharged and the switches are again closed.

The metal vapor laser can be operated as a chemical laser by filling chamber 52 with a gas such as fluorine or oxygen, depending on the metal coating 18 and the lasing wavelengths which are to be produced. In this configuration only the discharge from $C_1$ is used to produce the vapor while the pumping of the laser comes from a chemical reaction between the metal vapor and the gas. After the first discharge of $C_1$ and lasing occurs, compounds are formed which plate out on the wall of tube 12. For successive firings of the laser, the discharge from $C_1$ must be sufficient to evaporate these compounds and also to dissociate the compounds so that they can recombine chemically to produce lasing. Because of this additional requirement the first firing of the laser will be more efficient than the others. In this mode of operation the device functions as an electrically initiated, pulsed, chemical laser and can be made to produce many different wavelengths which may be selected for particular applications. Various compounds which can be made to lase under these conditions include, for example, titanium oxide, copper fluoride, titanium fluoride, aluminum fluoride, uranium oxide and other similar metal-gas combinations.

An alternate embodiment to the metal vapor laser shown in the single FIGURE is to replace the capacitor pumping system with a set of charged transmission lines and triggered spark gaps for providing sequential pulses of energy to the laser. It will be apparent to those skilled in the art that other changes may be made in the form of the laser disclosed without departing from the spirit of the invention as set forth in the disclosure, and that in some cases certain features of the invention may sometimes be used to advantage without a corresponding use of other features. It is therefore to be understood that within the scope of the appended claims, the invention may be practiced otherwise than as specifically described. Accordingly, it is desired that the scope of the invention be limited only by the appended claims.

We claim:

1. A metal vapor laser comprising: a glass tube, a metal coating around the inner surface of said tube, first and second cylindrical electrodes at respective ends of said tube, said electrodes being disposed coaxial with said tube and in contact with the ends of said metal coating for conducting electrical current through the metal coating therebetween, first and second optical windows covering respective ends of said electrodes, pumping means coupled to said electrodes for coupling electrical energy thereto and through said metal coating for vaporizing said metal, and for producing a population in said vapor, and means for stimulating the emission of a laser beam therefrom.

2. A metal vapor laser as set forth in claim 1 wherein said pumping means comprises a triggered spark gap, an inductor and a capacitor connected in series across said electrodes; a power supply connected across said capacitor for providing charging current thereto and a switching circuit coupled to a trigger of said triggered spark gap for activating said spark gap and thereby coupling energy across said metal plating for vaporizing said metal within the tube chamber.

3. A metal vapor laser as set forth in claim 2 wherein said pumping means further comprises a second spark gap connected in series with a second capacitor across said electrodes for coupling periodic pulses of electrical current to said electrodes and through said metal vapors, a power source connected across said second capacitor for providing charging current thereto, and switching means for activating said power source simultaneously with said spark gap triggering.

4. A metal vapor laser as set forth in claim 3 wherein said switching circuit for activating said triggered spark gap includes a transformer, a switch, and a battery; the primary of said transformer being connected in series with said switch and said battery, and the secondary of said transformer being connected between a trigger electrode of said spark gap and one side of the gap for initiating breakdown of the gap when the switch is closed.

5. A metal vapor laser as set forth in claim 1 wherein said stimulating means is a superradiant laser medium.

6. A metal vapor laser as set forth in claim 1 wherein said stimulating means is an optical resonant cavity.

7. A metal vapor laser as set forth in claim 1 wherein said metal coating is copper.

* * * * *